(12) United States Patent
Venable et al.

(10) Patent No.: US 6,173,728 B1
(45) Date of Patent: Jan. 16, 2001

(54) SWITCHING VALVE FOR A HYDRAULIC POWER STEERING SYSTEM

(75) Inventors: Frederick D. Venable, Lafayette; Bernard C. Hudgens, West Lafayette; Lowell D. Stingley, Clarks Hill; Gary L. Vandermolen, Fort Wayne, all of IN (US)

(73) Assignee: TRW Inc., Lyndhurst, OH (US)

( * ) Notice: Under 35 U.S.C. 154(b), the term of this patent shall be extended for 0 days.

(21) Appl. No.: 09/187,594

(22) Filed: Nov. 6, 1998

(51) Int. Cl.⁷ ..................................................... F15B 13/04
(52) U.S. Cl. .............................. 137/112; 60/405; 180/406
(58) Field of Search ............................. 60/405; 137/112; 180/406

(56) References Cited

U.S. PATENT DOCUMENTS

| Re. 25,036 | 9/1961 | Donner et al. . |
|---|---|---|
| 3,279,558 | 10/1966 | Allen et al. . |
| 3,280,557 | 10/1966 | Sattavara . |
| 3,747,725 | 7/1973 | Feustel et al. . |
| 4,237,993 | 12/1980 | Jablonsky . |
| 5,257,670 | 11/1993 | Miller et al. . |

FOREIGN PATENT DOCUMENTS

| 1555906 | 1/1970 | (DE) . |
|---|---|---|
| 926831 | 5/1963 | (GB) . |
| 2001287 | 1/1979 | (GB) . |
| 2049585 | 12/1980 | (GB) . |
| 1593974 | 7/1981 | (GB) . |
| 2151996 | 7/1985 | (GB) . |
| 2154188 | 9/1985 | (GB) . |

OTHER PUBLICATIONS

A copy of European Search Report dated Feb. 2, 2000.

*Primary Examiner*—Gerald A. Michalsky
(74) *Attorney, Agent, or Firm*—Tarolli, Sundheim, Covell, Tummino & Szabo L.L.P.

(57) ABSTRACT

A switching valve (50) for a hydraulic power steering system (10) includes a longitudinally movable valve spool (80). A spring (86) biases the spool (80) to a neutral position. The switching valve (50) is configured to direct hydraulic fluid from a primary pump (34) to a steering control valve (14) when the spool (80) is in a primary position, and to direct hydraulic fluid from an auxiliary pump (38) to the control valve (14) when the spool (80) is in an auxiliary position. The spool (80) is movable against a bias of the spring (86) from the neutral position to the primary position under the influence of a hydraulic fluid pressure differential between the opposite ends of the spool (80). The switching valve (50) defines a flow path for directing hydraulic fluid from the primary pump (34) to an end of the spool (80) when the spool (80) is in the neutral position. The flow path extends axially over a flat portion (124) of an outer surface of the spool (80).

11 Claims, 4 Drawing Sheets

SWITCHING VALVE FOR A HYDRAULIC POWER STEERING SYSTEM

FIELD OF THE INVENTION

The present invention relates to a valve for use in a hydraulic power steering system.

BACKGROUND OF THE INVENTION

A hydraulic power steering system for a vehicle includes a steering control valve. The control valve controls the pressure of hydraulic fluid flowing between a pump, a reservoir, and a hydraulic power steering actuator. A steering linkage connects the actuator to a pair of steerable vehicle wheels. When the driver of the vehicle rotates the steering wheel, the control valve responds by varying hydraulic fluid pressures in the actuator. The system thus provides hydraulic power steering assistance to the steerable wheels that are linked to the actuator.

The pump is driven by the vehicle engine. If the engine fails, the pump may fail to provide a flow of hydraulic fluid that is sufficient to operate the actuator. Therefore, a hydraulic power steering system may include an auxiliary pump which is driven by a ground-engaging vehicle wheel or other driving means. If the engine should fail while the vehicle is in motion, the auxiliary pump can provide a flow of hydraulic fluid sufficient for operating the actuator. Such a steering system further includes a switching valve between the control valve and the two pumps. The switching valve directs hydraulic fluid to the control valve selectively from the two pumps.

SUMMARY OF THE INVENTION

The present invention comprises a switching valve for use in a hydraulic power steering system with a primary pump, an auxiliary pump, and a steering control valve.

The switching valve includes a longitudinally movable valve spool. A spring biases the spool to a neutral position. The switching valve is configured to direct hydraulic fluid from the primary pump to the control valve when the spool is in a primary position, and to direct hydraulic fluid from the auxiliary pump to the control valve when the spool is in an auxiliary position. The spool is movable against a bias of the spring from the neutral position to the primary position under the influence of a hydraulic fluid pressure differential between the opposite ends of the spool.

In accordance with a principal feature of the present invention, the switching valve defines a pair of flow paths for directing fluid from the primary pump to the opposite ends of the spool when the spool is in the neutral position. One of the flow paths is constricted relative to the other. As a result, the hydraulic fluid pressure differential develops more rapidly than if one of the flow paths were not relatively constricted.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
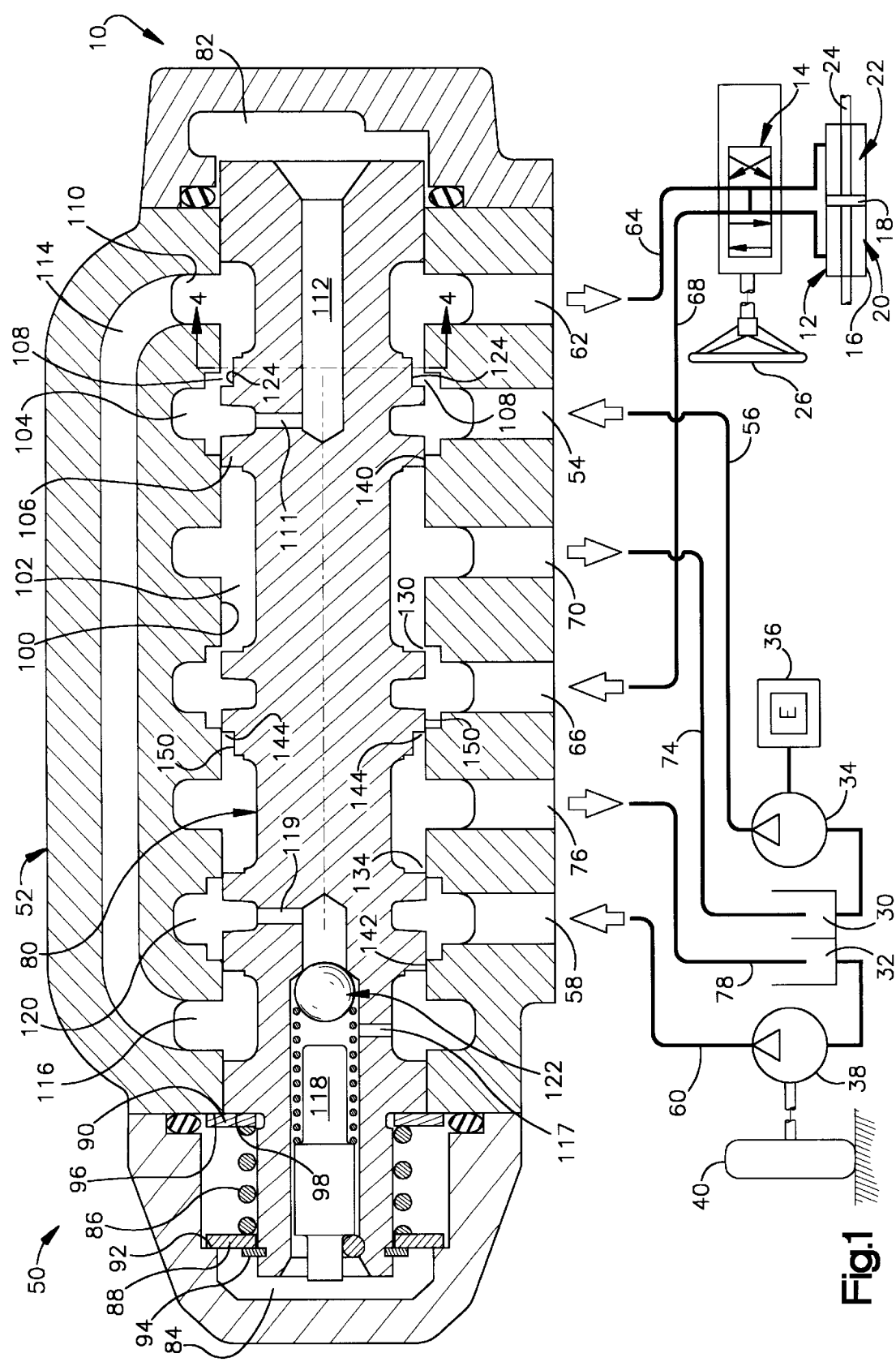
FIG. 1 is a view of an apparatus including a switching valve comprising a preferred embodiment of the present invention.

FIG. 1 shows parts of a hydraulic power steering system 10 comprising a preferred embodiment of the present invention. The system 10 includes a hydraulic power steering actuator 12 and a steering control valve 14. The actuator 12 in the preferred embodiment includes a cylinder 16 containing a piston 18 between a pair of variable volume hydraulic fluid chambers 20 and 22. An output member 24 projects in opposite directions from the piston 18. The output member 24 is linked at its opposite ends to steerable vehicle wheels (not shown). The control valve 14 responds to rotation of the steering wheel 26 by directing hydraulic fluid to one of the chambers 20 and 22, and by simultaneously venting hydraulic fluid from the other chamber 20 or 22. The resulting variation in hydraulic fluid pressures in the chambers 20 and 22 imparts movement to the piston 18 and the output member 24 so as to provide power steering assistance to the steerable wheels in accordance with rotation of the steering wheel 26.

The system 10 further includes a pair of hydraulic fluid reservoirs 30 and 32. A primary pump 34 is connected between the first reservoir 30 and the control valve 14. The primary pump 34 is driven by the vehicle engine 36 to provide the control valve 14 with a pressurized flow of hydraulic fluid under ordinary vehicle operating conditions. An auxiliary pump 38 is connected between the second reservoir 32 and the control valve 14. The auxiliary pump 38 is driven by a ground-engaging vehicle wheel 40 to provide the control valve 14 with a pressurized flow of hydraulic fluid upon failure of the primary pump 34 and/or the engine 36. A switching valve 50 is connected between the two pumps 34 and 38 and the control valve 14. The switching valve 50 operates in accordance with the present invention to direct hydraulic fluid to the control valve 14 from either the primary pump 34 or the auxiliary pump 38.

The switching valve 50 has a housing 52 with a plurality of hydraulic fluid ports. These include a first inlet port 54 which receives hydraulic fluid from the primary pump 34 through a primary supply line 56. A second inlet port 58 receives hydraulic fluid from the auxiliary pump 38 through an auxiliary supply line 60. An outlet port 62 directs hydraulic fluid from the switching valve 50 to the control valve 14 through a control valve supply line 64. A third inlet port 66 receives hydraulic fluid returning from the control valve 14 through a control valve return line 68. A first return port 70 directs hydraulic fluid from the switching valve 50 back to the first reservoir 30 through a first reservoir return line 74, and a second return port 76 directs hydraulic fluid from the switching valve 50 back to the second reservoir 32 through a second reservoir return line 78.

A generally cylindrical valve spool 80 is received in the housing 52. The spool 80 and the housing 52 together define a pair of variable volume hydraulic fluid reaction chambers 82 and 84 at the opposite ends of the spool 80. A spring 86 biases the spool 80 to a neutral position, as shown in FIG. 1. The spool 80 is movable longitudinally from the neutral position against a bias of the spring 86 under the influence of a hydraulic fluid pressure differential between the two reaction chambers 82 and 84.

Figure 2:
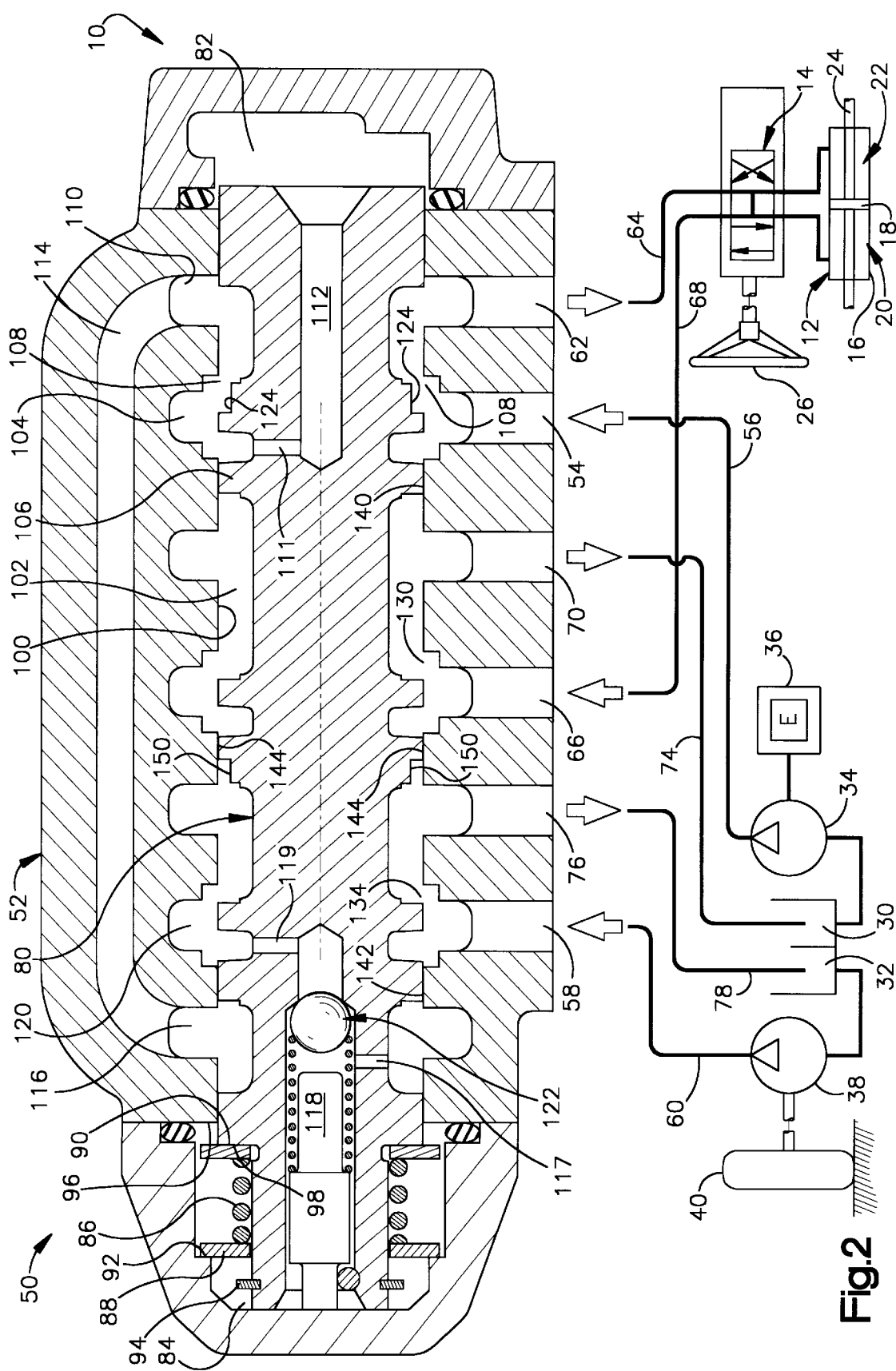
FIG. 2 is a view similar to FIG. 1 showing certain parts of the switching valve in shifted positions.

The spool 80 is movable to the left, as viewed in FIG. 1, from the neutral position to a primary position (FIG. 2).

Figure 3:
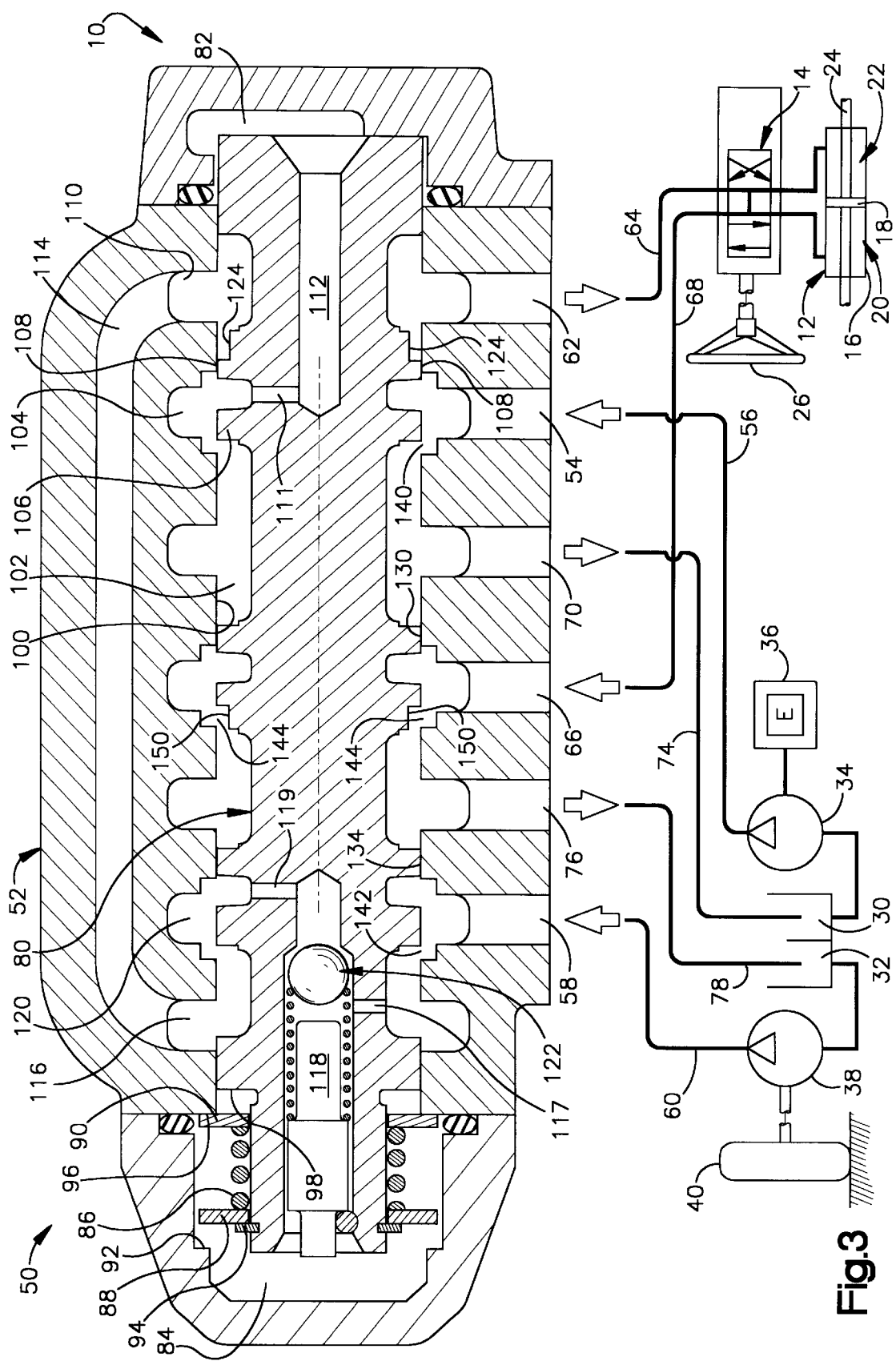
FIG. 3 also is a view similar to FIG. 1, with certain parts of the switching valve being shown in differently shifted positions.

When the spool 80 is in the primary position, the switching valve 50 directs hydraulic fluid from only the primary pump 34 to the control valve 14. The spool 80 is alternatively movable to the right, as viewed in FIG. 1, from the neutral position to an auxiliary position (FIG. 3). The switching valve 50 then directs hydraulic fluid from only the auxiliary pump 38 to the control valve 14.

A pair of flat rings 88 and 90 are received over the spool 80. The spring 86 is compressed between the flat rings 88 and 90 and urges them axially away from one another. As shown in FIG. 1, the first flat ring 88 abuts an annular surface 92 of the housing 52, and also abuts a split ring 94 which is interlocked with the spool 80. The second flat ring 90 abuts an oppositely facing annular surface 96 of the housing 52, and also abuts a radially extending surface 98 of the spool 80. When the spool 80 moves to the left or right from the neutral position, one of the flat rings 88 and 90 is pushed toward the other against the bias of the spring 86. The spring 86 then urges the flat rings 88 and 90 back to the spaced apart positions of FIG. 1, and thereby urges the spool 80 back to the neutral position.

The spring 86 holds the spool 80 in the neutral position when the vehicle is at rest before the engine 36 is started. When the engine 36 is started, the primary pump 34 responds by initiating a startup flow of hydraulic fluid from the first reservoir 30 to the first inlet port 54 in the switching valve 50. The startup flow is directed through the switching valve 50 from the first inlet port 54 to the outlet port 62, and is conveyed from the outlet port 62 to the control valve 14 by the control valve supply line 64. The startup flow is further directed through the switching valve 50 to the reaction chambers 82 and 84 at the opposite ends of the spool 80. This enables the startup flow to develop a pressure differential that shifts the spool 80 from the neutral position to the primary position.

Figure 4:
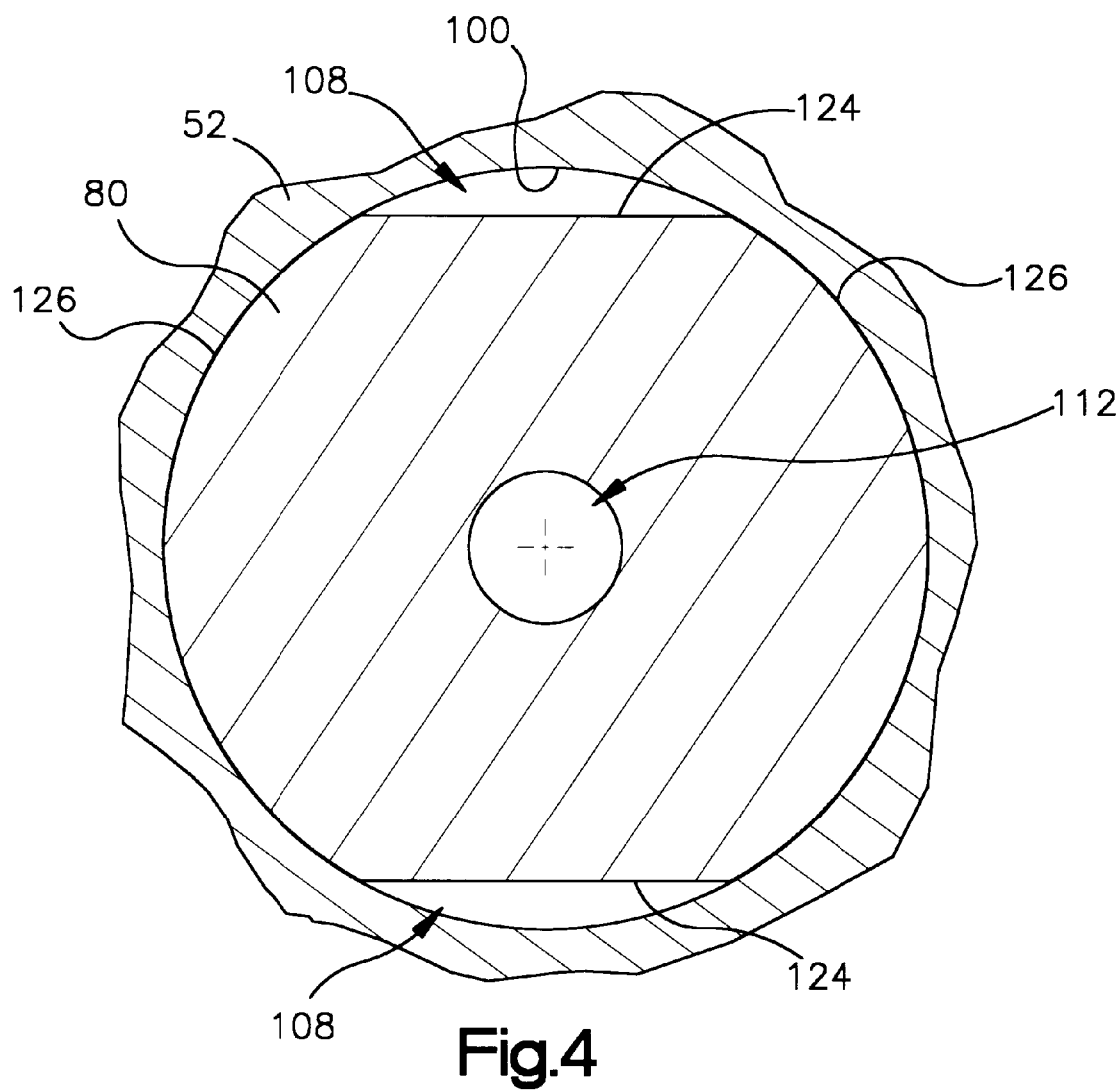
FIG. 4 is a view taken on line 4—4 of FIG. 1.

Specifically, the housing 52 has a cylindrical inner surface 100 defining an elongated cylindrical bore 102 in which the spool 80 is received. A plurality of grooves in the housing 52 extend circumferentially around the bore 102. These include a first groove 104 which intersects the first inlet port 54. A cylindrical land 106 on the spool 80 projects axially across the first groove 104. A pair of orifices 108 along the land 106 communicate the first groove 104 with the bore 102. As best shown in FIG. 4, the orifices 108 have diametrically opposite locations between the housing 52 and the spool 80. A second groove 110 in the housing 52 communicates the bore 102 with the outlet port 62. Accordingly, the startup flow of hydraulic fluid is directed through the orifices 108 from the first inlet port 54 to the outlet port 62 when the spool 80 is in the neutral position.

A radial passage 111 in the spool 80 extends partially through the land 106 at a location axially adjacent to the first groove 104 in the housing 52. An axial passage 112 in the spool 80 extends from the radial passage 111 to the first reaction chamber 82 to communicate the first groove 104 with the first reaction chamber 82. The switching valve 50 thus defines a first internal flow path for directing the startup flow of hydraulic fluid from the first inlet port 54 to the first reaction chamber 82.

A second internal flow path further directs the startup flow from the first inlet port 54 to the second reaction chamber 84 at the other end of the spool 80. The second internal flow path extends from the first groove 104 through the orifices 108. The second internal flow path continues through the bore 102 to the second groove 110, and further through an elongated passage 114 extending through the housing 52 from the second groove 110 to a third groove 116 near the opposite end of the bore 102. A relatively small radial passage 117 in the spool 80 communicates the third groove 116 with another axial passage 118. The axial passage 118 communicates the radial passage 117 with the second reaction chamber 84.

The axial passage 118 in the spool 80 also communicates another radial passage 119 with the second reaction chamber 84. That radial passage 119 is located axially adjacent to a fourth groove 120 in the housing 52. The fourth groove 120 intersects the second inlet port 58. A check valve 122 closes the axial passage 118 between the fourth groove 120 and the second reaction chamber 84 when the spool 80 is in the neutral position.

As noted above, the startup flow of hydraulic fluid develops a pressure differential between the reaction chambers 82 and 84 for shifting the spool 80 from the neutral position (FIG. 1) to the primary position (FIG. 2). The pressure differential between the reaction chambers 82 and 84 is due in part to the configurations of the orifices 108 in the second internal flow path leading to the second reaction chamber 84. As shown in FIG. 4, the orifices 108 are defined between the cylindrical inner surface 100 of the housing 52 and a pair of flat outer surface portions 124 of the spool 80. The flat outer surface portions 124 of the spool 80 are separated from each other by a pair of cylindrical outer surface portions 126 that adjoin the cylindrical inner surface 100 of the housing 52. The orifices 108 are thus configured to constrict the second internal flow path relative to the first internal flow path. This causes the startup flow of hydraulic fluid in the first internal flow path to pressurize the first reaction chamber 82 more rapidly and to a greater elevated level. Such pressurization of the first reaction chamber 82 causes the spool 80 to shift rapidly to the left from the neutral position to the primary position upon startup of the engine 36 and the primary pump 34.

As shown in FIG. 2, the orifices 108 are enlarged substantially when the spool 80 is shifted to the primary position. Enlargement of the orifices 108 enables the flow of hydraulic fluid from the first inlet port 54 to the outlet port 62 to increase from the startup level to an ordinary operating level. An annular orifice 130 between the third inlet port 66 and the first return port 70 is simultaneously enlarged to enable a corresponding return flow to the first reservoir 30 at a low level of pressure loss.

As further shown in FIG. 2, an annular orifice 134 between the second inlet port 58 and the second return port 76 is opened when the spool 80 is shifted from the neutral position to the primary position. Hydraulic fluid flowing from the auxiliary pump 38 to the switching valve 50 is thereby diverted back to the second reservoir 32. This feature of the switching valve 50 helps to ensure that the primary and auxiliary flows of hydraulic fluid are isolated from each other.

The pressure differential between the two reaction chambers 82 and 84 retains the spool 80 in the primary position during ordinary vehicle operating conditions. Hydraulic fluid then flows continuously through the switching valve 50 from the primary pump 34 to the control valve 14 for operation of the actuator 12 under the influence of the primary pump 34 and the engine 36. A failure of the engine 36 and/or the primary pump 34 may cause the pressure differential to decrease to a level at which the spring 86 can move the spool 80 back from the primary position of FIG. 2 toward the neutral position of FIG. 1. The orifice 134 between the second inlet port 58 and the second return port 76 will close shortly before the spool 80 returns to the neutral position. A flow of hydraulic fluid from the auxiliary pump 38 to the second inlet port 58 will then overcome the resistance of the check valve 122 and will further pressurize the axial passage 118 and the second reaction chamber 84. As a result, an oppositely acting pressure differential rapidly develops between the reaction chambers 82 and 84 to shift the valve 80 further to the right past the neutral position of FIG. 1 and fully to the auxiliary position of FIG. 3. In accordance with this feature of the present invention, the radial passage 117 is smaller than the radial passage 119. The smaller size of the passage 117 provides a correspondingly greater pressure drop. The greater pressure drop promotes rapid pressurization of the axial passage 118 and the second reaction chamber 84, and thereby promotes rapid movement of the spool 80 to the auxiliary position of FIG. 3.

The orifices 108 between the first inlet port 54 and the outlet port 62 are closed upon movement of the spool 80 toward the auxiliary position. This occurs as the land 106 on the spool 80 moves from left to right beside the cylindrical inner surface 100 of the housing 52 at those locations. An annular orifice 140 at the opposite end of the land 106 is opened upon movement of the spool 80 toward the auxiliary position. The orifice 140 communicates the first inlet port 54 with the first return port 70. A residual flow, if any, from the primary pump 34 is thereby diverted back to the first reservoir 30. A transitional lock of the spool 80 is avoided in accordance with the present invention by not closing the orifices 108 before the orifice 140 opens.

An annular orifice 142 between the second inlet port 58 and the third groove 116 also is opened when the spool 80 is shifted to the auxiliary position. The hydraulic fluid flowing from the auxiliary pump 38 to the second inlet port 58 can then bypass the check valve 122 and continue fully to the outlet port 62 through the third groove 116, the elongated passage 114, and the second groove 110. The control valve supply line 64 conveys that flow of hydraulic fluid to the control valve 14 for operation of the actuator 12 under the influence of the auxiliary pump 38 and the ground-engaging vehicle wheel 40.

As further shown in FIG. 3, the orifice 130 between the third inlet port 66 and the first return port 70 is closed when the spool 80 is shifted to the auxiliary position. A pair of adjacent orifices 144 between the third inlet port 66 and the second return port 76 are opened. Hydraulic fluid returning from the control valve 14 is thereby diverted from the first return port 70 to the second return port 76 to avoid mixing of the primary and auxiliary flows. The orifices 144 preferably begin to open before the orifice 130 fully closes. This helps to prevent excessive back pressure at the control valve 14. However, the orifice 130 closes before the orifice 140 opens. This prevents the fluid that is flowing through the orifice 140 from the primary pump 34 to the first return port 70 from mixing with the fluid that is flowing from the third return port 66 to the second return port 76 and further to the second reservoir 32.

Like the orifices 108 described above, the orifices 144 are defined between the cylindrical inner surface 100 of the housing 52 and a pair of flat outer surfaces 150 at diametrically opposite locations on the spool 80. This provides a pressure drop greater than the pressure drop that would otherwise be provided by an annular orifice at the same axial location on the spool 80. When the spool 80 is in the auxiliary position of FIG. 3, the relatively greater pressure drop from the third inlet port 66 to the second return port 76 helps to stabilize and hold the spool 80 in the auxiliary position.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from the primary pump to the control valve when said spool is in a primary position and to direct hydraulic fluid from the auxiliary pump to the control valve when said spool is in an auxiliary position;

said spool being movable against a bias of said spring from said neutral position to said primary position under the influence of a hydraulic fluid pressure differential between opposite ends of said spool;

said switching valve defining a flow path for directing hydraulic fluid from the primary pump to an end of said spool when said spool is in said neutral position, said flow path extending axially over a flat portion of an outer surface of said spool.

2. Apparatus as defined in claim 1 wherein said switching valve defines an additional flow path for directing hydraulic fluid from the primary pump to the control valve when said spool is in said neutral position, said additional flow path extending axially over an additional flat outer surface portion of said spool.

3. Apparatus as defined in claim 2 wherein said flat outer surface portions of said spool have diametrically opposite locations on said spool.

4. Apparatus as defined in claim 5 wherein said spool further has a pair of cylindrical outer surface portions, each of which extends circumferentially from one to the other of said flat outer surface portions.

5. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from the primary pump to the control valve when said spool is in a primary position and to direct hydraulic fluid from the auxiliary pump to the control valve when said spool is in an auxiliary position;

said spool being movable against a bias of said spring from said neutral position to said primary position under the influence of a hydraulic fluid pressure differential between opposite ends of said spool;

said switching valve defining a pair of flow paths for directing fluid from the primary pump to said opposite ends of said spool when said spool is in said neutral position, one of said flow paths being constricted relative to the other;

said spool having a flat outer surface portion defining a constricted section of said one flow path.

6. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from only the primary pump to the control valve when said spool is in a primary position and to direct hydraulic fluid from only the auxiliary pump to the control valve when said spool is in an auxiliary position;

said spool being movable against a bias of said spring from said neutral position to said primary position under the influence of a hydraulic fluid pressure differential between opposite ends of said spool;

said switching valve being further configured to direct hydraulic fluid from the primary pump to said opposite ends of said spool when said spool is in said neutral position;

said neutral position of said spool being between said primary position and said auxiliary position.

7. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from only the primary pump to the control valve when said spool is in a primary position and to direct hydraulic fluid from only the auxiliary pump to the control valve when said spool is in an auxiliary position;

said spool being movable against a bias of said spring from said neutral position to said primary position under the influence of a hydraulic fluid pressure differential between opposite ends of said spool;

said switching valve being further configured to direct hydraulic fluid from the primary pump to said opposite ends of said spool when said spool is in said neutral position;

said switching valve defining a pair of reaction chambers at said opposite ends of said spool and further defining a corresponding pair of flow paths for directing fluid from the primary pump to said reaction chambers when said spool is in said neutral position, one of said flow paths being constricted relative to the other;

said spool having a flat outer surface portion defining a constricted section of said one flow path.

8. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from the primary pump to the control valve when said spool is in a primary position and to direct hydraulic fluid from the auxiliary pump to the control valve when said spool is in an auxiliary position;

said spool being movable against a bias of said spring from said neutral position to said primary position under the influence of a hydraulic fluid pressure differential between opposite ends of said spool;

said spool being movable against a bias of said spring from said neutral position to said auxiliary position under the influence of a hydraulic fluid pressure differential between opposite ends of said spool;

said switching valve defining a pair of flow paths for directing fluid from the primary pump to said opposite ends of said spool when said spool is in said neutral position, one of said flow paths being constricted relative to the other.

9. Apparatus for use with a primary pump, an auxiliary pump, and a steering control valve, said apparatus comprising:

a switching valve including a longitudinally movable valve spool and a spring biasing said spool to a neutral position, said switching valve being configured to direct hydraulic fluid from only the primary pump to the control valve when said spool is in a primary position and to direct hydraulic fluid from only the auxiliary pump to the control valve when said spool is in an auxiliary position;

said spool being movable against a bias of said spring from said neutral position to said primary position under the influence of a hydraulic fluid pressure differential between opposite ends of said spool;

said spool being movable against a bias of said spring from said neutral position to said auxiliary position under the influence of a hydraulic fluid pressure differential between opposite ends of said spool;

said switching valve being further configured to direct hydraulic fluid from the primary pump to said opposite ends of said spool when said spool is in said neutral position.

10. Apparatus as defined in claim 9 wherein said switching valve has surfaces configured to direct hydraulic fluid from only the primary pump to the control valve when said spool is in said neutral position.

11. Apparatus as defined in claim 9 wherein said switching valve defines a pair of reaction chambers at said opposite ends of said spool and further defines a corresponding pair of flow paths for directing fluid from the primary pump to said reaction chambers when said spool is in said neutral position, one of said flow paths being constricted relative to the other.

* * * * *

UNITED STATES PATENT AND TRADEMARK OFFICE
CERTIFICATE OF CORRECTION

PATENT NO.   : 6,173,728 B1                                       Page 1 of 1
DATED        : January 16, 2001
INVENTOR(S)  : Frederick D. Venable et al.

It is certified that error appears in the above-identified patent and that said Letters Patent is hereby corrected as shown below:

<u>Column 6,</u>
Line 37, change "5" to -- 3 --.

Signed and Sealed this

Twentieth Day of May, 2003

JAMES E. ROGAN
*Director of the United States Patent and Trademark Office*